Patented July 22, 1947

2,424,284

UNITED STATES PATENT OFFICE 2,424,284

FIXATION OF FINELY DIVIDED SUBSTANCES

Henry Charles Olpin, Sydney Alfred Gibson, and William Cyril McKnight, Spondon, near Derby, England, assignors to British Celanese Limited, London, England, a company of Great Britain No Drawing. Application December 21, 1943, Serial No. 515,146. In Great Britain February 22, 1943

5 Claims. (Cl. 117—144.5)

This invention relates to the fixation of finely divided insoluble substances, for example coloured and white mineral pigments, on textile fabrics, films, foils and like materials, especially materials having a basis of an artificial organic fibre-forming polymer.

It is well known to produce coloured and other effects, especially reduction of lustre, on materials of the kind referred to by applying a finely divided water insoluble substance e. g. a white or coloured pigment to the material and fixing it thereon. Thus for example materials having a basis of cellulose acetate or other ester or ether of cellulose are commonly delustred by fixing on the materials a finely divided white pigment such as titanium dioxide or barium sulphate. The fixation is commonly effected by the use of albumen applied in the sol form in a paste containing the pigment and insolubilised by heating the material. The use of albumen however, apart from difficulties of suppy, has certain disadvantages which are difficult to overcome. Thus for example materials on which pigments have been fixed by albumen possess a certain harshness which is increased by laundering operations to which the fabrics containing it are normally subjected. This is especially objectionable in the case of fabrics intended for use in underwear. Moreover, compositions containing albumen and the pigment cannot be kept for long before use without undesirable changes occurring.

The present invention provides a method by which pigments, including white pigments, can be fixed on fabrics of cellulose acetate and other textile materials, ribbons and films, to give products which are free from the disadvantages referred to above. According to the invention the pigment is fixed by applying the pigment to the material together with an aqueous substantially acid-free solution of a condensation product of an aldehyde with a base containing a plurality of basic amino groups, and converting said condensation product into a water-insoluble condensation product on the material by the action of heat in the presence of an acid.

Preferably the process is carried out by applying to the material a water-soluble acid of moderate strength and preferably a solid acid such as tartaric acid, for instance by a padding operation, drying the materials so that they retain the acid, applying the pigment, for instance in a printing paste, together with the soluble condensation product, which is preferably a condensation product of an aldehyde such as formaldehyde with an amino-triazine such as melamine, and drying the materials at an elevated temperature. Titanium oxide or barium sulphate applied in this way to materials having a basis of cellulose acetate or other ester or ether of cellulose, produces a pleasant delustre effect which is not destroyed even by many successive soap-scouring operations. The effect is quite different in appearance from the dulling which can be produced by means of formaldehyde-melamine condensation products themselves under certain conditions when present in finely divided form on the materials. These conditions evidently do not obtain when the process is carried out as described above, since if the mineral pigment is omitted in that process no delustring is obtained.

In forming the condensation products various proportions of aldehyde to organic base may be employed. Preferably the molecular ratio of aldehyde to base should be at least 2:1 but useful products can be obtained using a lower ratio, for example 1:1. On the other hand, it is usually preferable for the ratio of aldehyde to base to be higher than 2:1, for example 3:1 or 4:1 up to 6:1 or even higher. Condensation should not be allowed to proceed beyond the stage of water solubility before application to the material. Products formed by carrying condensation beyond this stage may be dissolved in a slightly acid solution and may be further condensed on the materials in such a way as to exert a fixing effect on pigments and the like, but the presence of acid in the composition containing the condensation product entails many disadvantages among which are the danger of premature condensation, and lack of uniformity in the products. It is also possible to obtain some fixation by applying to the material the aldehyde and base as such instead of in the form of an intermediate condensation product but in this case also the products are inferior and the method more difficult to work than when a water-soluble condensation product is employed.

The invention may be illustrated in connection with the production of delustre effects on a fabric of cellulose acetate by fixing a white mineral pigment thereon by means of a condensation product of formaldehyde with melamine. This may be done as follows:

63 parts of powdered melamine are added to 170 parts of 40% aqueous formaldehyde which has been neutralised with sodium carbonate. The mixture is warmed as quickly as possible to 80° on a water bath and maintained at this temperature until the melamine has dissolved, which should not take more than a few minutes.

It is then cooled to room temperature and allowed to stand over-night. The white mass thus formed is broken up and spread on trays to dry in the air. It quickly becomes friable and is then ground in a mortar to a fine white powder. An aqueous printing paste is then made up containing about 10% of the formaldehyde-melamine powder and about the same weight of titanium dioxide, barium sulphate or a mixture of the two. A suitable thickening agent is gum tragacanth. The fabric to be treated is first padded with a 10% aqueous solution of tartaric acid and dried so that the acid is retained in the material. The dried material is then printed all over with the paste referred to and dried at about 60–110° C. The material is then washed in cold water and again dried. This treatment imparts to the material a pleasant delustre effect which is substantially unchanged even after being scoured several times in a 0.5% soap solution at 90° C.

Local effects can be obtained in various ways. For instance the paste containing the pigment and the condensation product can be printed only on to the portions of the fabric which are to be delustred. A preferred method is to apply to those parts of the dried fabric containing the acid which are to retain their lustre, before the application of the pigment and condensation product, an alkaline resist. This resist may, for example, comprise an aqueous paste containing about 5 parts of caustic soda or about 6 parts of sodium carbonate, and thickened with gum tragacanth or British gum (the former is preferable). After the application of this paste to the areas of the fabric which are to retain their lustre, the fabric is dried and printed all over with a paste containing the condensation product and pigment such as is described above. The fabric is then again dried, steamed for half an hour, washed in water, soaked for a quarter of an hour at about 60° C. in a 0.5% soap solution and again dried. Coloured lustrous effects can be obtained on a delustred ground by employing as the resist a printing paste containing suitable colouring agents. The paste may comprise, for example, about 6% of sodium carbonate, about 8% of sodium formaldehyde sulphoxylate and up to 20% of a vat dyestuff.

Instead of tartaric acid other solid water-soluble acids of about the same strength can be employed, for example citric acid, malic acid or malonic acid. Somewhat stronger acids, e. g., oxalic acid, can also be employed but care must be taken not to use an acid sufficiently strong to damage the materials when dried in them or to act too rapidly on the soluble condensation product. Acids much weaker than tartaric do not react sufficiently rapidly at temperatures at which textile fabrics are normally dried. The best results have been obtained using acids of ionisation constant (for the first hydrogen atom) of from about $10^{-5}$ to $10^{-3}$. The acid, when applied to the material before the application of the pigment and condensation product must be of sufficiently low volatility to remain in the materials and the best results have been obtained with acids which are solid at ordinary temperatures. The materials impregnated with the acid and dried can be stored for considerable periods without deterioration and the substantially neutral printing pastes of the invention are considerably more stable than similar pastes containing albumen as the fixing agent. The process of the invention does not involve any substantial filling of the fabric.

Although it is preferred to apply the acid first to the fabric, and then to apply the pigment together with the condensation product as described above, this order of operations is not essential. It is however important that the composition in which the condensation product is applied is free from any acid of even moderate strength since such acids cause rapid insolubilisation of the water-soluble condensation products applied. The acid employed in condensation may however be applied to the materials after they have been printed with the condensation product and pigment or the like and dried, thus for instance fixation may be effected by treatment of the fabric for about 5 minutes in an acid bath, for example an aqueous solution of about 3.5% acetic acid at about 80% C. Other acids may be employed to produce baths of similar pH value. Thus, for example, other acids of ionisation constant within the range specified above may be employed. The quality of the materials treated by this method, however, is inferior to that of materials padded first with a solid acid and subsequently printed with the condensation product and pigment or the like as described above, and there is some danger of removal of pigment before condensation occurs.

A further method is to subject the fabric to which the condensation product and pigment or the like have been applied without preliminary impregnation with an acid, to the vapours of a volatile acid which is insufficiently strong to damage the material. Thus for instance the fabric may be exposed for about 10 minutes to a warm, dry atmosphere saturated with the vapor of acetic acid or other volatile acid of ionisation constant within the range specified above. A better condensation is obtained by this method than by applying the acid in a subsequent bath treatment, but the results are still inferior to those obtained by pre-impregnation with a solid acid and in addition the subsequent treatment with said vapours represents an undesirable complication in the process.

One further method by which fixation may be obtained, without pre-impregnation of the fabric with acid, is to apply the condensation product and pigment or the like in a composition which is of such weakly acid reaction that insolubilisation of the condensation product does not occur rapidly, but is sufficiently acid in reaction to ensure fixation when the material carrying the condensation product and pigment or the like is subjected to a heat treatment, for example at a temperature of about 120–160° C. We have found for instance that the compositions containing the condensation product and pigment or the like together with about 1% of boric acid can be allowed to stand for at least 24 hours without precipitation and that fixation of the pigment or the like on materials to which such a composition has been applied can be effected by a heat treatment for about 10 minutes at about 150° C. Somewhat similar results can be obtained using instead of boric acid a potentially acid substance (i. e., a substance of substantially neutral reaction which when heated develops acidity), e. g., ammonium acetate, ammonium phosphate, or ammonium tartrate. Stronger acids such as acetic acid cannot be employed without rapid precipitation occurring and this occurs much more rapidly with acids of the strength of tartaric and citric acids than with acetic acid. This use of compositions containing the condensation product and pigment together with a weakly acid substance enables the application to be effected by a padding treatment but it has a serious disadvantage compared with the method of preimpregnation with acid, of involving an additional heat treatment at a relatively high temperature. This heat treatment demands special and expensive equipment. It will be appreciated therefore that the method involving pre-impregnation of the fabric with a water-soluble, solid acid of moderate strength, followed by application of the condensation product and pigment or the like, presents very substantial advantages over all the other methods referred to.

We have described above the production of materials exhibiting a lustrous coloured pattern on a delustred ground. The process of the invention also enables coloured delustre effects to be obtained. For this purpose coloured lustreless pigments may be used in place of the white pigments referred to. An alternative method is to incorporate suitable dyestuffs in the composition containing the condensing agent and pigment. It is not necessary for the colouring agents to have any affinity for the materials to be coloured, thus for example on materials having a base of cellulose acetate or other ester or ether of cellulose, coloured delustre effects can be obtained by the application of compositions containing the condensation product together with the pigment or other water-insoluble finely divided substance and a water-soluble dyestuff, for example a cotton dye. Other dyes that can be employed include vat dyes in the leuco form. On the other hand these compositions may contain dyestuffs having affinity for the cellulose derivatives, for example basic dyes or dispersed insoluble cellulose ester dyes. The presence of the condensation products on the materials in some cases has a valuable effect in protecting the dyestuff and the textile material against the combined deteriorating effect of light and the inorganic pigment. Such effects are commonly encountered when pigments which are oxides such as titanium oxide are employed. Moreover some of the most useful blue to violet dyestuffs for cellulose esters normally undergo change of shade when exposed to the combustion products of coal gas. The presence of the condensation product very considerably increases the resistance of such dyes to these combustion products. A further advantage of the treatment of the invention is that it increases the fire-resistance of the materials.

The word "pigment" is used herein to denote finely divided water-insoluble white or coloured substances broadly, including metallic powders such as powdered bronze and powdered aluminium.

The invention has been described with particular reference to the use of condensation products of melamine with formaldehyde since outstandingly good results have been obtained in this way. Similar condensation products however, obtained by condensing melamine with aldehydes other than formaldehyde, for example acetaldehyde, benzaldehyde or furfural may be employed as may condensation products in which the melamine is replaced by other amino triazines, for example ammeline and ammelide, substitution products of these bases in which part of the nitrogen attached to the amino groups is replaced by an alkyl or aryl group as well as substitution products in which one or two of the amino groups of melamine or one of those of ammeline, are replaced by alkyl, or aralkyl groups or halogen atoms. Other bases containing a plurality of basic nitrogenous groups may be employed in place of the amino triazines referred to, but with results which are generally less satisfactory although not without utility. Among such bases are aliphatic diamines such as ethylene diamine and hexamethylene diamine and ureid bases, for example urea, thiourea, guanidine, dicyandiamide and biguanide.

The invention is of special importance in connection with materials having a basis of cellulose acetate or other ester or ether of cellulose, for example cellulose propionate, cellulose butyrate, cellulose acetate-propionate, cellulose acetate-butyrate and other mixed esters of cellulose containing the radicles of acetic acid and a higher fatty acid, ethyl cellulose, benzyl cellulose and ethyl cellulose acetate. The invention may also be applied to materials of regenerated cellulose, made for example by the viscous process or the cuprammonium process, or by the saponification of cellulose ester materials, especially materials comprising cellulose acetate fibres of tenacity in excess of about 2 grams per denier, such as may be made by stretching cellulose acetate fibres of normal tenacity in steam, hot water, or a stretch-assisting agent. A further application of the invention is in the treatment of materials having a basis of a fibre-forming polymer of an unsaturated compound, for example polystyrene, polymethylmethacrylate, polyvinylidine chloride and co-polymers of two or more of such unsaturated monomers, for example polyvinyl chloride-acetate. Materials comprising linear polyamides can also be treated. Although of primary importance in the treatment of fibres (including continuous filaments), and textile products composed of or containing such fibres, the methods of the invention may also be applied to other materials, e. g. ribbons, films and foils, formed of any of the fibre-forming substances referred to above.

Having described our invention, what we desire to secure by Letters Patent is:

1. Process for fixing pigments on textile materials, ribbons or films having a basis of cellulose acetate which comprises impregnating the material with an aqueous solution of a solid acid of ionisation constant (for the first hydrogen atom) of not less than $10^{-4}$, drying the impregnated material so that it retains the acid, applying the pigment to the material in the form of a paste containing a water soluble condensation product of an aldehyde with an amino triazine, and heating the materials so as to effect the conversion of the water-soluble condensation product to a water-insoluble condensation product.

2. Process for fixing pigments on textile materials, ribbons or films having a basis of cellulose acetate which comprises impregnating the material with a 10% aqueous solution of tartaric acid, drying the impregnated material so that it retains the acid, applying the pigment to the material in the form of a paste containing a water soluble melamine formaldehyde condensation product, and heating the materials so as to effect the conversion of the water-soluble condensation product to a water-insoluble condensation product.

3. Process according to claim 2 wherein a white pigment is employed to diminish the lustre of the material.

4. Process according to claim 2, wherein pattern effects are obtained by the overall application to the material of a solid acid and subsequent drying of the material so that it retains the acid, followed by the local application of an alkline paste and then application of the paste containing the pigment and water-soluble condensation product, and finally heating the material so as to effect the conversion of the water-soluble condensation product to a water-insoluble condensation product.

5. Process according to claim 2, wherein lustrous colored effects on a delustered ground are obtained by the overall application to the material of a solid acid and subsequent drying of the material so that it retains the acid, followed by the local application of an alkaline paste incorporating a suitable coloring agent, and then application of the paste containing the pigment and water-soluble condensation product, and finally heating the materials so as to effect the conversion of the water-soluble condensation product to a water-insoluble condensation product.

HENRY CHARLES OLPIN.
SYDNEY ALFRED GIBSON.
WILLIAM CYRIL McKNIGHT.

REFERENCES CITED

The following references are of record in the file of this patent:

UNITED STATES PATENTS

| Number | Name | Date |
| --- | --- | --- |
| 2,202,200 | Haller | May 28, 1940 |
| 2,123,152 | Rivat | July 5, 1938 |
| 2,219,375 | Widmer | Oct. 29, 1940 |
| 2,191,362 | Widmer | Feb. 20, 1940 |
| 2,342,641 | Cassel | Feb. 29, 1944 |
| 1,905,999 | Ellis | Apr. 25, 1933 |
| 2,119,150 | Bowen | May 31, 1938 |
| 2,249,069 | Wainwright | July 15, 1941 |
| 2,350,139 | Widmer | May 30, 1944 |

FOREIGN PATENTS

| Number | Country | Date |
| --- | --- | --- |
| 467,480 | Great Britain | June 14, 1937 |

Certificate of Correction

Patent No. 2,424,284. July 22, 1947.

HENRY CHARLES OLPIN ET AL.

It is hereby certified that errors appear in the printed specification of the above numbered patent requiring correction as follows: Column 4, line 19, for "80% C." read *80° C.*; line 45, for "said vapours" read *acid vapours*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.*

3. Process according to claim 2 wherein a white pigment is employed to diminish the lustre of the material.

4. Process according to claim 2, wherein pattern effects are obtained by the overall application to the material of a solid acid and subsequent drying of the material so that it retains the acid, followed by the local application of an alkline paste and then application of the paste containing the pigment and water-soluble condensation product, and finally heating the material so as to effect the conversion of the water-soluble condensation product to a water-insoluble condensation product.

5. Process according to claim 2, wherein lustrous colored effects on a delustered ground are obtained by the overall application to the material of a solid acid and subsequent drying of the material so that it retains the acid, followed by the local application of an alkaline paste incorporating a suitable coloring agent, and then application of the paste containing the pigment and water-soluble condensation product, and finally heating the materials so as to effect the conversion of the water-soluble condensation product to a water-insoluble condensation product.

HENRY CHARLES OLPIN.
SYDNEY ALFRED GIBSON.
WILLIAM CYRIL McKNIGHT.

REFERENCES CITED

The following references are of record in the file of this patent:

UNITED STATES PATENTS

| Number | Name | Date |
|---|---|---|
| 2,202,200 | Haller | May 28, 1940 |
| 2,123,152 | Rivat | July 5, 1938 |
| 2,219,375 | Widmer | Oct. 29, 1940 |
| 2,191,362 | Widmer | Feb. 20, 1940 |
| 2,342,641 | Cassel | Feb. 29, 1944 |
| 1,905,999 | Ellis | Apr. 25, 1933 |
| 2,119,150 | Bowen | May 31, 1938 |
| 2,249,069 | Wainwright | July 15, 1941 |
| 2,350,139 | Widmer | May 30, 1944 |

FOREIGN PATENTS

| Number | Country | Date |
|---|---|---|
| 467,480 | Great Britain | June 14, 1937 |

Certificate of Correction

Patent No. 2,424,284. July 22, 1947.

HENRY CHARLES OLPIN ET AL.

It is hereby certified that errors appear in the printed specification of the above numbered patent requiring correction as follows: Column 4, line 19, for "80% C." read *80° C.*; line 45, for "said vapours" read *acid vapours*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.*